US010315493B2

(12) United States Patent
Vespa et al.

(10) Patent No.: US 10,315,493 B2
(45) Date of Patent: Jun. 11, 2019

(54) HVAC SYSTEM FOR A VEHICLE AND METHOD OF USE

(71) Applicants: HYUNDAI MOTOR COMPANY, Seoul (KR); KIA MOTORS CORPORATION, Seoul (KR)

(72) Inventors: Antonio Vespa, Tehachapi, CA (US); Nicos Agathocleous, Canton, MI (US); John Meyer, Livonia, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 211 days.

(21) Appl. No.: 15/634,278

(22) Filed: Jun. 27, 2017

(65) Prior Publication Data

US 2018/0370330 A1 Dec. 27, 2018

(51) Int. Cl.
*B60H 1/00* (2006.01)
*B60H 1/03* (2006.01)
*B60H 1/32* (2006.01)

(52) U.S. Cl.
CPC ......... *B60H 1/034* (2013.01); *B60H 1/00278* (2013.01); *B60H 1/00778* (2013.01); *B60H 1/00828* (2013.01); *B60H 1/3208* (2013.01); *B60H 1/00271* (2013.01); *B60H 1/00385* (2013.01); *B60H 2001/00307* (2013.01)

(58) Field of Classification Search
CPC ............ B60H 1/00007; B60H 1/00392; B60H 1/004; B60H 1/0005; B60H 2001/00121; B60H 2001/00128; B60H 2001/00164; B60H 2001/00307; B60H 1/00385; B60H 1/034; B60H 1/143; B60H 1/2215; B60H 1/2221; B60H 1/0027; B60H 1/00778
See application file for complete search history.

(56) References Cited

U.S. PATENT DOCUMENTS

| 8,851,153 | B2 * | 10/2014 | Park | B60K 6/46 165/41 |
| 2002/0134540 | A1 * | 9/2002 | Ieda | B60H 1/00842 165/204 |
| 2008/0245504 | A1 * | 10/2008 | Eisenhour | B60H 1/00849 165/43 |

(Continued)

FOREIGN PATENT DOCUMENTS

KR 10-2011-0134213 A 12/2011

*Primary Examiner* — Jianying C Atkisson
*Assistant Examiner* — Jose O Class-Quinones
(74) *Attorney, Agent, or Firm* — Brinks Gilson & Lione (57) ABSTRACT

The present disclosure provides an HVAC system for a vehicle having a first heat source and having a primary loop through which a coolant circulates and a secondary loop through which refrigerant circulates. The primary loop having two parallel sub-loops, namely a first sub-loop and a second sub-loop in which the coolant may circulate. The first sub-loop of the primary loop includes the first heat source, a second heat source, and a first heat exchanger. The first sub-loop may partially extend into a case of the HVAC system to place the first heat exchanger adjacent an air heater. The second sub-loop of the primary loop includes the first heat source, the second heat source, and a second heat exchanger. The HVAC system having a plurality of operation modes for efficiently conditioning air in a cabin of the vehicle.

18 Claims, 7 Drawing Sheets

(56) References Cited

U.S. PATENT DOCUMENTS

| | | | |
|---|---|---|---|
| 2013/0213631 A1* | 8/2013 | Ichishi | B60H 1/00021 |
| | | | 165/202 |
| 2014/0069123 A1* | 3/2014 | Kim | F25B 5/04 |
| | | | 62/61 |
| 2014/0208789 A1 | 7/2014 | Lombardo et al. | |
| 2014/0230469 A1* | 8/2014 | Park | F25B 49/022 |
| | | | 62/115 |
| 2014/0311704 A1* | 10/2014 | Yokoyama | H02K 9/19 |
| | | | 165/41 |

* cited by examiner

*FIG. 7*
(ALTERNATIVE EMBODIMENT)

HVAC SYSTEM FOR A VEHICLE AND METHOD OF USE

FIELD

The present disclosure relates to a heating, ventilation, and air conditioning system of a vehicle and a method for efficiently heating a vehicle cabin with the system.

BACKGROUND

The statements in this section merely provide background information related to the present disclosure and may not constitute prior art.

In general, a heating, ventilating, and air conditioning system for a vehicle includes an air conditioning module for warming or cooling a passenger compartment or cabin of the vehicle. The air conditioning module uses a compressor to circulate a heat exchange medium through a condenser, an expansion valve, an evaporator, etc. With this arrangement, the air conditioning system warms up or cools the cabin of the vehicle.

In a vehicle having a conventional internal combustion engine, the engine produces the power and heat used for the operation of the air conditioning system. Meanwhile, electricity is the sole or main power source for running environmentally friendly vehicles such as an electric vehicle, a plug-in hybrid electric vehicle, a fuel cell vehicle, and a hybrid vehicle, so that the consumption of electricity directly affects the travel capacity of the vehicles.

The auto-industry has strived for developing various technologies and systems to improve energy efficiency of the air conditioning system and at the same time for simplifying the system to reduce weight and manufacturing cost. However, there remains a desire to further increase energy efficiency and further reduce the cost of such HVAC systems.

SUMMARY

The present disclosure provides a heating, ventilation, and air conditioning system of a vehicle and a method for efficiently heating a vehicle cabin with the system.

In one form, the present disclosure provides a heating, ventilation, and air conditioning (HVAC) system for a vehicle having a first heat source and a cabin. In this form, the HVAC system comprises a case having a blower for providing air to the cabin of the vehicle, a primary loop through which a coolant circulates and a secondary loop through which refrigerant circulates. The primary loop has a first sub-loop and a second sub-loop in which the coolant may circulate. The first sub-loop of the primary loop includes the first heat source, a second heat source, and a first heat exchanger. The first sub-loop may partially extend into the case of the HVAC system to place the first heat exchanger adjacent an air heater. In this form, the second sub-loop of the primary loop includes the first heat source, the second heat source, and a second heat exchanger. The first and second sub-loops may share a common line including the first heat source and the second heat source. The secondary loop may include a third heat exchanger, a compressor, an expansion valve, and an evaporator. The secondary loop exchanging heat with the second sub-loop of the primary loop.

According to various forms of the present disclosure, the first and second heat exchangers may be coolant-to-air heat exchangers, the third heat exchanger may be a refrigerant-to-air heat exchanger, the first heat source may be at least one of a motor, an electric device, or an onboard charger of an electric vehicle, the second heat source may be an electric coolant heater disposed along the primary loop downstream of the first heat source, and/or the air heater is an electric heater that is powered by a traction battery.

In yet another form, the primary loop may further include a control valve disposed downstream of the second heat source. The control valve being configured to control whether the coolant circulates in the first sub-loop or the second sub-loop of the primary loop.

According to various forms of the present disclosure, the system may include a preconditioning mode, a heating mode, a dry heating mode, and a cooling mode. The preconditioning mode may occur when the vehicle is charging and idling and when a measured temperature of the air in the cabin is less than a desired temperature of the air in the cabin. In the preconditioning mode coolant may be circulated in the first sub-loop of the primary loop and heated by the first heat source. In this mode of operation, the second heat source is on to further heat the coolant, and the refrigerant is not circulated in the secondary loop.

According to another form, the preconditioning mode may further include the air heater being off and the blower not providing airflow to the cabin until the coolant circulating in the first sub-loop of the primary loop is heated to a predetermined coolant temperature. In another form, when the coolant circulating in the first sub-loop of the primary loop is heated to the predetermined coolant temperature, the preconditioning mode may further include the blower in the case providing airflow to the cabin. In this mode, the air provided to the cabin is heated by the first heat exchanger and the air heater is on to further heat the air as it is provided to the cabin.

In the cooling mode, coolant heated by the first heat source may be circulated in the second sub-loop of the primary loop and cooled as it passes through the second heat exchanger. In the cooling mode the second heat source is off, the air heater is off, the refrigerant is circulated in the secondary loop, and the blower in the case provides airflow to the cabin. The air provided to the cabin is cooled as it passes through the evaporator.

In the heating mode, coolant heated by the first heat source may be circulated in the first sub-loop of the primary loop. In this mode, the second heat source is off, the refrigerant is not circulated in the secondary loop, and the blower in the case provides airflow to the cabin. The air provided to the cabin is heated as it passes through the first heat exchanger. The air provided is further heated by the air heater.

In the dry heating mode, coolant heated by the first heat source may be circulated in the first portion of the primary loop. In this mode, the second heat source is off, the air heater is off, the refrigerant is circulated in the secondary loop, and the blower in the case provides airflow to the cabin. The air provided to the cabin is dehumidified as it passes through the evaporator and is heated as it passes through the first heat exchanger.

In yet another form, the present disclosure provides method of efficiently heating a cabin of a vehicle. The method comprising: providing a heating, ventilation, and air conditioning (HVAC) system comprising: a primary loop through which a coolant circulates, the primary loop having a first sub-loop and a second sub-loop, the first sub-loop including a first heat source, a second heat source, and a first heat exchanger, the first sub-loop partially extending into a case of the HVAC system to place the first heat exchanger adjacent an air heater, the second sub-loop of the primary loop including the first heat source, the second heat source, and a second heat exchanger, the primary loop further having a control valve disposed downstream of the second heat source, the control valve configured to control whether the coolant circulates in the first sub-loop or the second sub-loop of the primary loop based on a selected mode of operation; and a secondary loop through which a refrigerant circulates, the secondary loop including a third heat exchanger, a compressor, an expansion valve, and an evaporator; determining, by an Engine Control Unit (ECU), that the vehicle is charging and that the vehicle is idling; measuring, by a sensor, a cabin temperature in the cabin of the vehicle; and determining whether the cabin temperature measured is less than a desired temperature set point for the cabin.

Another form provides that when it is determined that the cabin temperature measured is less than the desired temperature set point for the cabin, the method may further comprise operating the HVAC system in a preconditioning mode. The preconditioning mode including: operating the secondary loop in an off mode, wherein refrigerant is not circulated in the secondary loop; operating second heat source in an on mode, wherein the second heat source produces heat; and circulating the coolant in the first sub-loop of the primary loop, wherein the coolant is heated by waste heat dissipated by the first heat source and wherein the coolant is further heated by heat produced by the second heat source.

In yet another form, when the coolant circulating in the first sub-loop has a temperature that is less than a predetermined coolant temperature, the preconditioning mode further includes: operating the air heater in an off mode, wherein the air heater does not produce heat; and operating the blower in an off mode, wherein the blower does not provide airflow to the cabin.

Additionally, when the coolant circulating in the first sub-loop has a temperature that is greater than or equal to a predetermined coolant temperature, the preconditioning mode may further include: operating the blower in an on mode, wherein the blower provides airflow to the cabin; and operating the air heater in an on mode, wherein the air heater produces heat; wherein air provided to the cabin by the blower is heated by heat dissipated by the first heat exchanger and by heat produced by the air heater.

In yet another form, when it is determined that the cabin temperature measured is greater than or equal to the desired temperature set point for the cabin, the method may further comprise operating the HVAC system in a heating mode. The heating mode may include: operating the secondary loop in an off mode, wherein refrigerant is not circulated in the secondary loop; operating second heat source in an off mode, wherein the second heat source does not produce heat; circulating the coolant in the first sub-loop of the primary loop, wherein the coolant is heated by waste heat dissipated by the first heat source; operating the blower in an on mode, wherein the blower provides airflow to the cabin; operating the air heater in an on mode, wherein the air heater produces heat; and wherein air provided to the cabin by the blower is heated by heat dissipated by the first heat exchanger and by heat produced by the air heater.

In another form, the method may further comprise operating the HVAC system in a dry heating mode, the dry heating mode including: operating the secondary loop in an on mode, wherein refrigerant is circulated in the secondary loop; operating second heat source in an off mode, wherein the second heat source does not produce heat; circulating the coolant in the first sub-loop of the primary loop, wherein the coolant is heated by waste heat dissipated by the first heat source; operating the blower in an on mode, wherein the blower provides airflow to the cabin; operating the air heater in an off mode, wherein the air heater does not produce heat; wherein air provided to the cabin by the blower is dehumidified as it passes through the evaporator and wherein the air provided to the cabin is heated by heat dissipated by the first heat exchanger.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present disclosure, the primary loop means a loop or a circuit to circulate a low pressure heat exchange medium such as a coolant, and the secondary loop means a loop or a circuit to circulate a high pressure heat exchange medium, for example, a refrigerant. However, the heat exchange medium is not limited to these exemplary forms.

Various aspects of the present disclosure are directed to providing a heating, ventilation, and air conditioning (HVAC) system for a vehicle having the advantages of using a waste heat source to heat a low pressure heat exchange medium (e.g., coolant) and exchange the heat between the coolant and air provided to the vehicle cabin to improve heating efficiency.

Generally, the present disclosure provides a heating, ventilation, and air conditioning (HVAC) system for a vehicle not shown. The HVAC system of the present disclosure is well suited for use with an environmentally friendly vehicle such as an electric vehicle, a plug-in hybrid electric vehicle, a fuel cell vehicle, and a hybrid vehicle. Such environmentally friendly vehicles are typically powered by electricity generated by a power source such as an electric motor.

Considerations associated with such environmentally friendly vehicles typically include the cost of the vehicle and the electric range of the vehicle. The electric range of the vehicle may be improved by reducing the weight of vehicle components and improving efficiency of various vehicle systems, i.e. reducing the power consumption of the vehicle systems.

The present disclosure provides an HVAC system having improved efficiency so that heating and cooling use less energy. In particular, the present disclosure provides an HVAC system that more efficiently heats a vehicle passenger compartment or cabin especially in approximately the first twenty minutes of vehicle operation and driving, which we have discovered is the period in which typical HVAC systems use the most energy.

Figure 1:
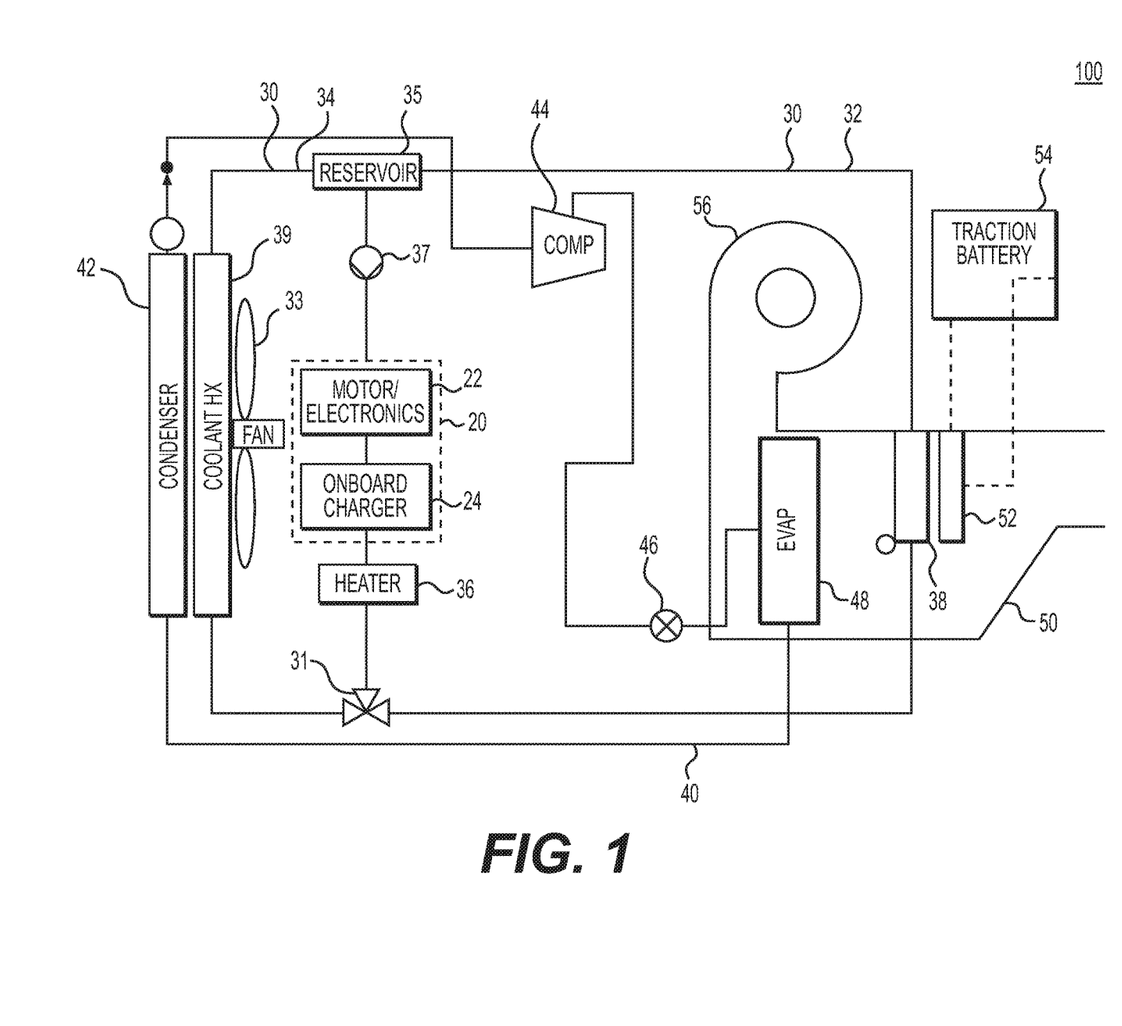
FIG. 1 is a schematic diagram of an HVAC system according to one form of the present disclosure.

Referring now to FIG. 1, one form of the present disclosure provides a heating, ventilation, and air conditioning (HVAC) system 100 for a vehicle (not shown) having a first heat source 20 and a cabin. The HVAC system also having a case having a blower for delivering air to the cabin of the vehicle. The first heat source 20 may be, for example, at least one of a motor 22, an electric device, or an onboard charger 24 of an electric vehicle. The heat generated and emitted by the first heat source 20 may be a byproduct or waste of the first heat source 20.

As shown in FIG. 1, the HVAC system 100 includes a primary loop 30 and a secondary loop 40. A coolant, or other suitable low pressure heat exchange medium, may be circulated in or through the primary loop 30. A refrigerant, or other suitable high pressure heat exchange medium, may be circulated through or in the secondary loop 40. The primary loop 30 has two parallel sub-loops, namely a first sub-loop 32 and a second sub-loop 34 in which the coolant may circulate. The first and second sub-loops 32, 34 share a common line 29.

The first sub-loop 32 of the primary loop 30 may include various components including the first heat source 20, a second heat source 36, and a first heat exchanger 38. The first sub-loop 32 may also include a reservoir 35 and/or a coolant pump 37. In some forms of the present disclosure, the second heat source 36 may be a heater, for example an electric heater, which may be powered by the motor 22 of the vehicle or another suitable power source. The second heat source 36 has an on mode in which it emits heat and an off mode in which it does not emit heat. In some forms, the first heat exchanger 38 may be a coolant-to-air heat exchanger. The various components of the first sub-loop 32 may be arranged in an upstream or downstream position relative to one another. Upstream being the direction opposite the flow of coolant as it circulates, and downstream being the direction in which the coolant flows as it circulates. The second heat source 36 is positioned downstream of the first heat source 20 so that when the second heat source 36 is in its on mode, heat emitted by the second heat source 36 may further heat the coolant that has previously been heated by waste heat emitted from the first heat source 20. The second heat source 36 may be, for example, an electric liquid heater such as a Positive Temperature Coefficient (PTC) heater, a resistive heater, or another similar electric heater with a low power output, i.e. approximately 1 kW.

Additionally, the first sub-loop 32 partially extends into a case 50 of the HVAC system 100 to place the first heat exchanger 38 adjacent an air heater 52. According to one form, the air heater 52 may be an electric heater that is powered by a traction battery 54. The air heater 52 may be an air Positive Temperature Coefficient (PTC) heater. The air heater 52 has an on mode in which it emits heat and an off mode in which it does not emit heat. The second heat source 36 may be further positioned upstream of the first heat exchanger 38. As the coolant is circulated in the first sub-loop 32, heat stored in the coolant is then dissipated by the first heat exchanger 38 to surrounding air in the case 50. Furthermore, the HVAC system 100 may include the blower 56 in the case 50. The blower 56 has an on mode in which the blower 56 blows or provides air to the cabin, and an off mode in which the blower 56 does not blow or provide air to the cabin. When the blower 56 is in its on mode, air provided to the cabin is conditioned as it passes through various HVAC components which may include an evaporator 48, the first heat exchanger 38, and the air heater 52.

In this form, the second sub-loop 34 of the primary loop 30 includes various components including the first heat source 20, the second heat source 36, and a second heat exchanger 39. The second sub-loop 34 may also include the reservoir 35 and/or the coolant pump 37. The first and second sub-loops 32, 34 share line 29 which includes the first heat source 20 and the second heat source 36. The common line 29 may extend from the reservoir 35 through the pump 37, the first heat source 20, and the second heat source 36 to the control valve 31. In some forms, the second heat exchanger 39 may be a coolant-to-air heat exchanger. The various components of the second sub-loop 34 may be arranged in an upstream or downstream position relative to one another. For example, the second heat exchanger 39 is positioned downstream of the second heat source 36. As the coolant is circulated in the second sub-loop 34, heat stored in the coolant is then dissipated by the second heat exchanger 39 to surrounding air. A cooling fan 33 may assist in cooling the coolant as it passes through the second heat exchanger 39.

In yet another form, the primary loop 30 may further include a control valve 31 disposed downstream of the second heat source 36. The control valve 31 may be controlled, for example by an engine control unit (ECU), to control the path in which coolant flows in the primary loop 30. The control valve 31 may be, for example, a three way valve. In particular, the control valve 31 controls whether the coolant circulates in the first sub-loop 32 or the second sub-loop 34 of the primary loop 30 based on which valve 31 ports are open or closed, which may be based on a selected mode of a plurality of modes of operation for efficiently conditioning air in the cabin of the vehicle. As shown, the control valve 31 is positioned downstream of the second heat source 36.

As further shown in FIG. 1, the HVAC system 100 of the present disclosure further includes the secondary loop 40. The secondary loop 40 may include a third heat exchanger 42 which may be a condenser or a refrigerant-to-air heat exchanger, a compressor 44, an expansion valve 46, and an evaporator 48. The secondary loop 40 may exchange heat with the second sub-loop 34 of the primary loop 30.

Figure 7:
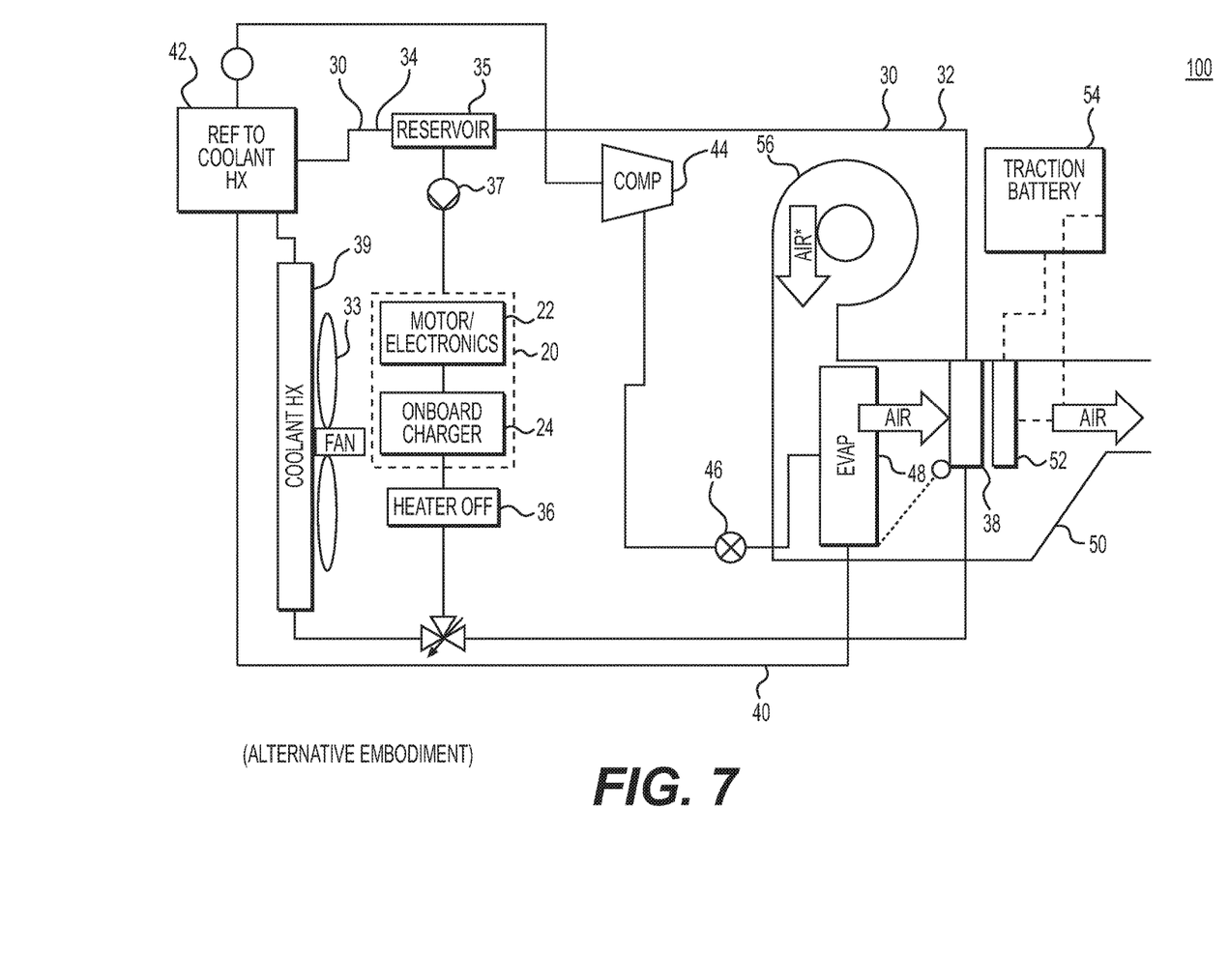
FIG. 7 is a schematic diagram of an HVAC system according to one form of the present disclosure.

As shown in FIG. 7, an HVAC system 100 of the present disclosure may include a third heat exchanger 42 that is a refrigerant-to-coolant heat exchanger, rather than a condenser. In this form, the control valve 31 is a variable three way coolant valve.

FIGS. 2-6 show the HVAC system 100 in various modes of operation for efficiently conditioning air in the cabin of the vehicle. According to various forms of the present disclosure, the modes of operation may include a preconditioning mode, a heating mode, a dry heating mode, and a cooling mode.

Figure 2:
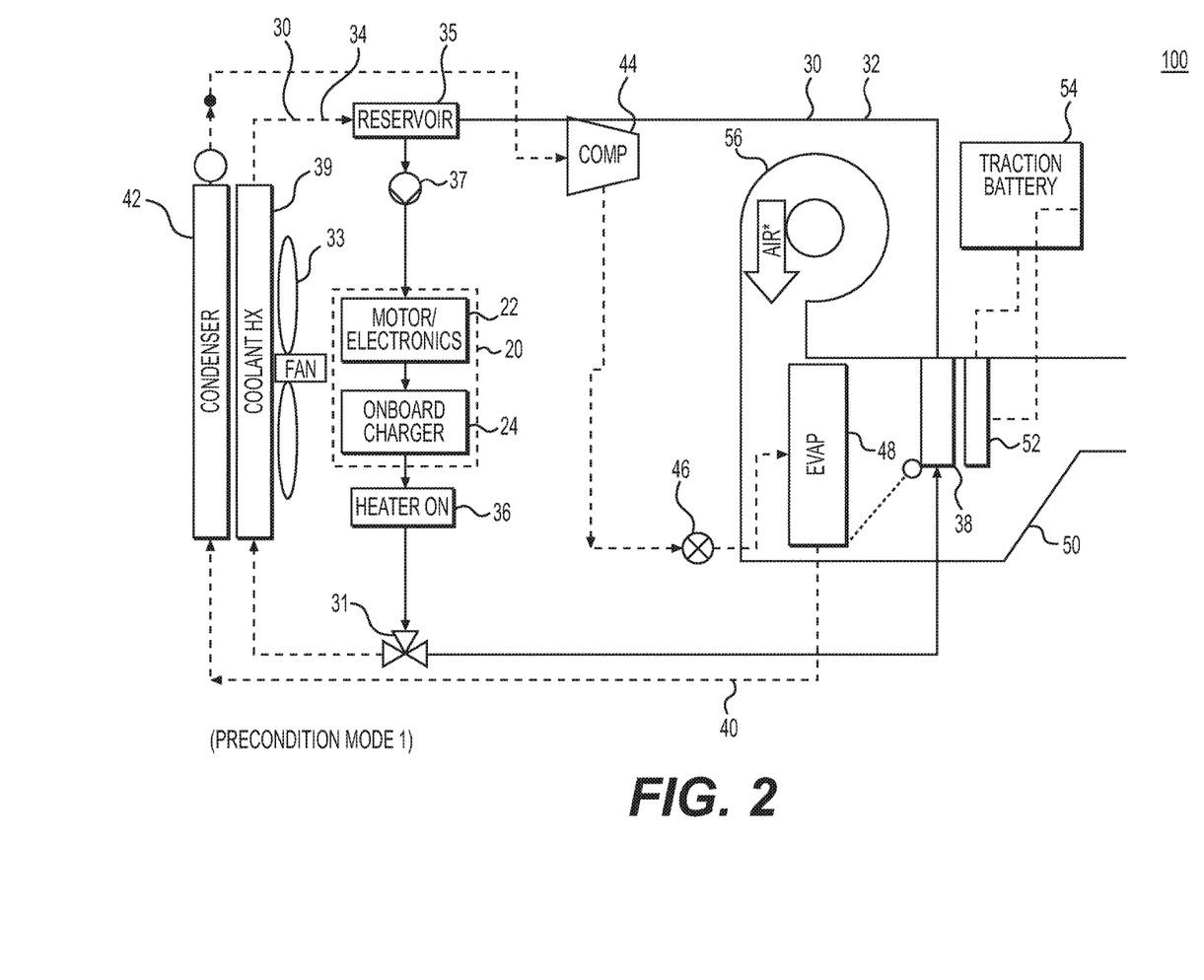
FIG. 2 is a schematic view illustrating an HVAC system in a first phase of a preconditioning mode.
Figure 3:
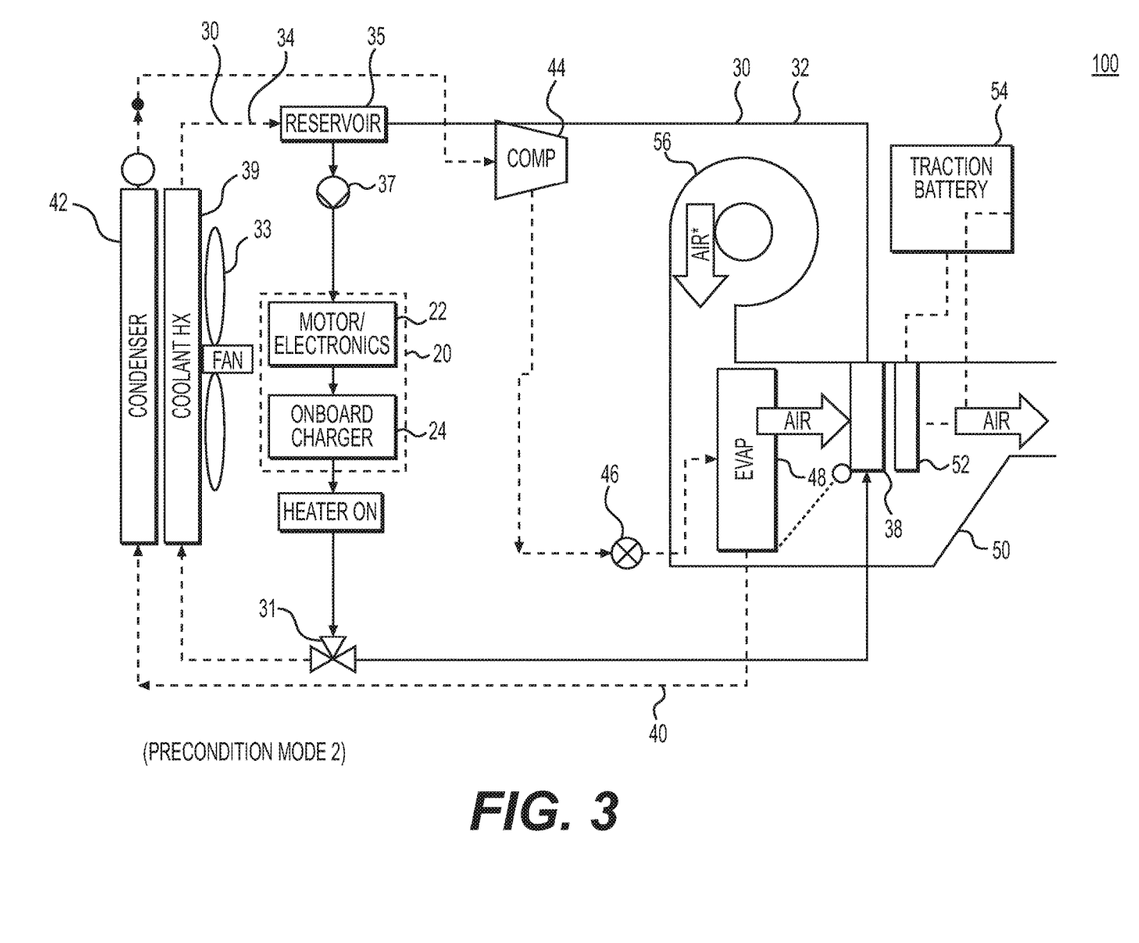
FIG. 3 is a schematic view illustrating an HVAC system in a second phase of a preconditioning mode.

FIGS. 2 and 3 show a first phase and a second phase of the preconditioning mode. The preconditioning mode occurs when the vehicle is charging and idling, and when a measured temperature of the air in the cabin is less than a desired temperature of the air in the cabin. Herein, vehicle charging means that the motor 22 or on board charger 24 is being supplied power, idling means that the vehicle is not in a driving state. An ECU may determine whether the vehicle is charging and idling. A sensor or any other suitable temperature sensing or measuring device may determine the measured temperature of the air in the cabin. The desired temperature may be a set temperature, for example programed into the vehicle control software or set by a vehicle user. The ECU, an onboard computer, or any other suitable vehicle component may determine if the measured temperature is less than the desired temperature of the air in the cabin. In both the first phase and second phase of the preconditioning mode, coolant may be circulated in the first sub-loop 32 of the primary loop 30 and heated by waste heat emitted from the first heat source 20. In this mode of operation, the second heat source 36 is on to further heat the coolant, and the refrigerant is not circulated in the secondary loop 40.

According to another form, the preconditioning mode, as shown in FIG. 2, may further include the air heater 52 being off and the blower 56 not providing airflow to the cabin until the coolant circulating in the first sub-loop 32 of the primary loop 30 is heated to a predetermined coolant temperature, for example approximately 60° C. As shown in FIG. 3, once the coolant circulating in the first sub-loop 32 of the primary loop 30 is heated to the predetermined coolant temperature, the preconditioning mode may further include the blower 56 in the case 50 providing airflow to the cabin. In this phase of the preconditioning mode, the air provided to the cabin is heated by the first heat exchanger 38 and the air heater 52 is on to further heat the air as it is provided to the cabin.

Figure 4:
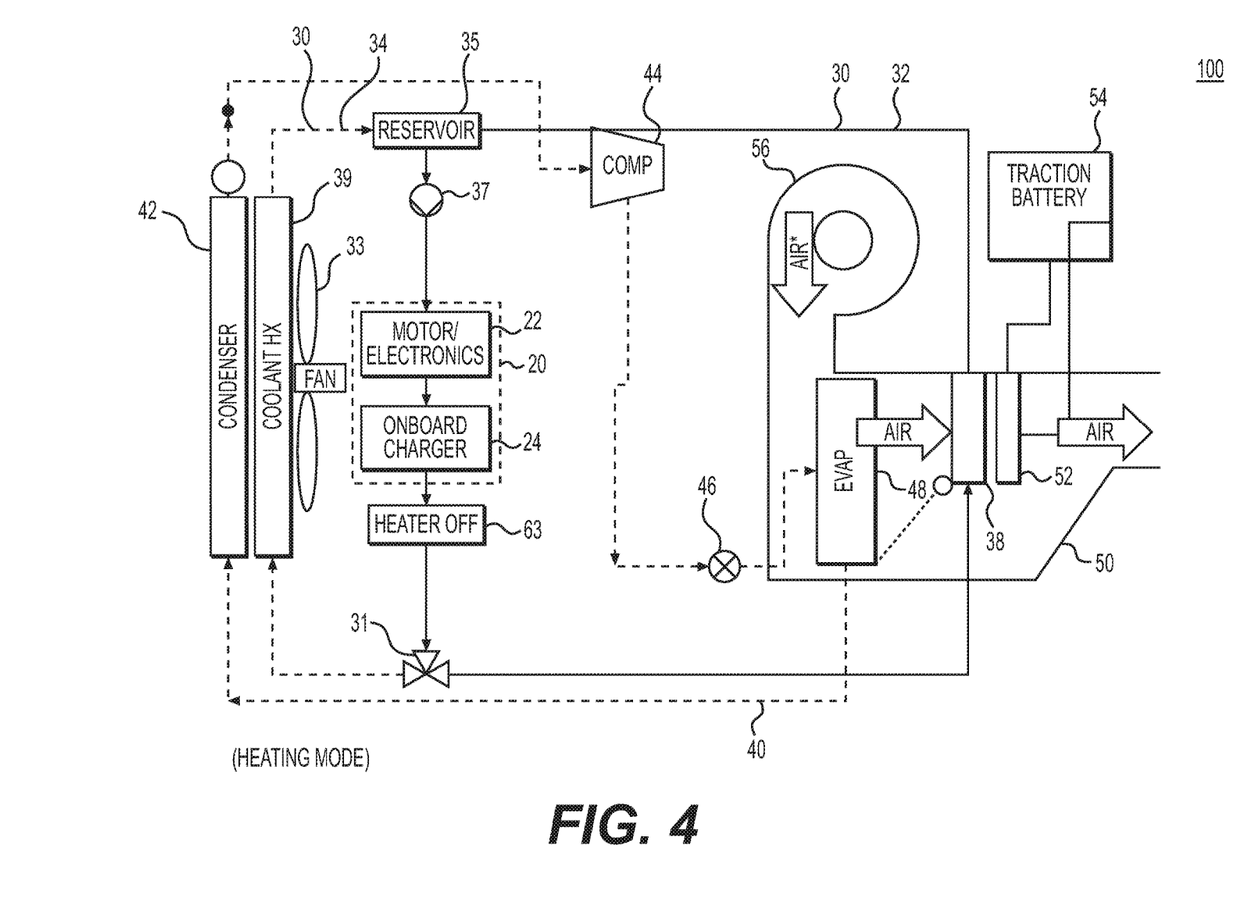
FIG. 4 is a schematic view illustrating an HVAC system in a heating mode.

FIG. 4 shows the HVAC system 100 in the heating mode. In the heating mode, coolant heated by the first heat source 20 is circulated in the first sub-loop 32 of the primary loop 30. In this mode, the second heat source 36 is off, the refrigerant is not circulated in the secondary loop 40, and the blower 56 in the case 50 provides airflow to the cabin. The air provided to the cabin is heated as it passes through the first heat exchanger 38. The air provided is further heated by the air heater 52.

Figure 5:
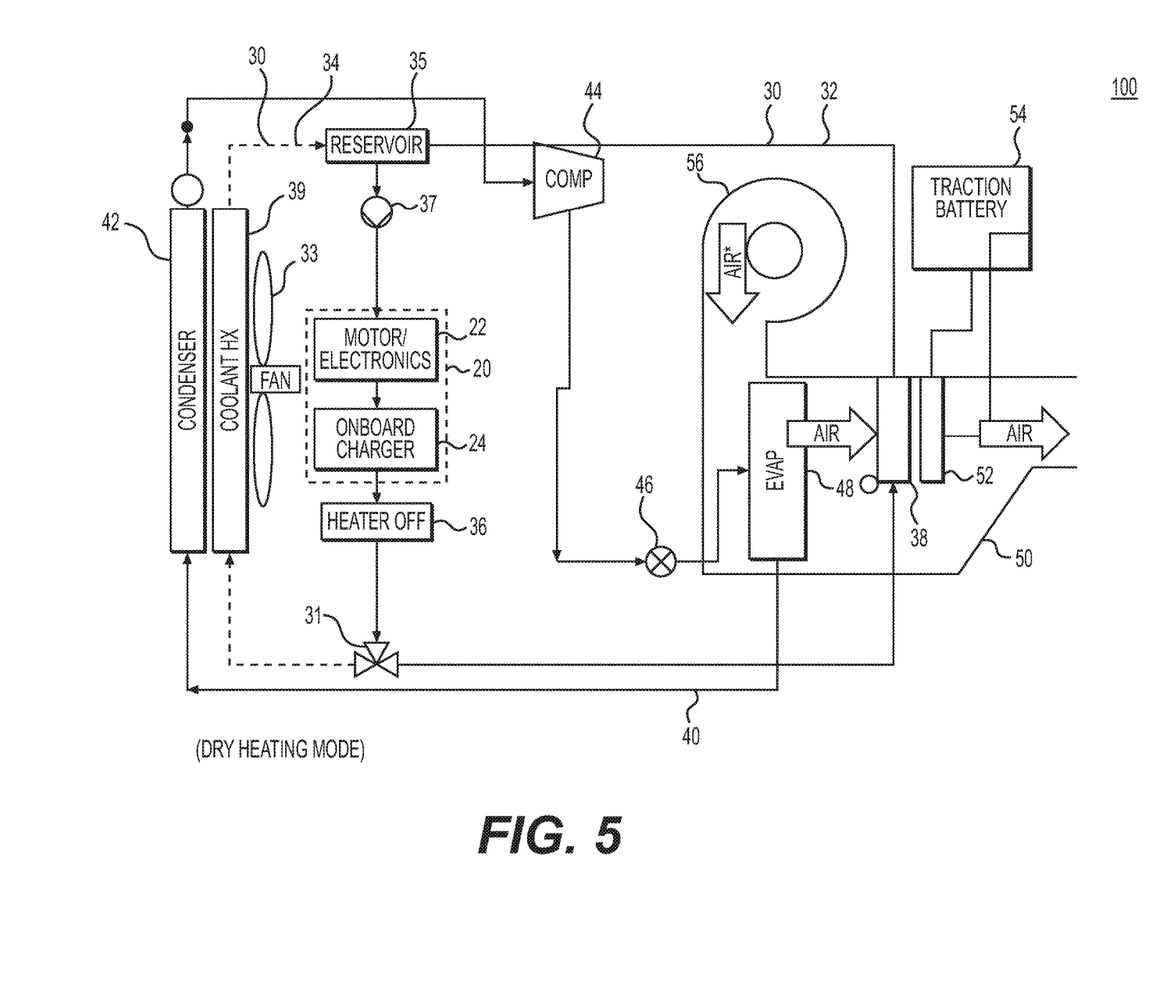
FIG. 5 is a schematic view illustrating an HVAC system in a dry heating mode.

FIG. 5 shows the HVAC system 100 in the dry heating mode. In the dry heating mode, coolant heated by the first heat source 20 is circulated in the first portion 32 of the primary loop 30. In this mode, the second heat source 36 is off, the air heater 52 is off, the refrigerant is circulated in the secondary loop 40, and the blower 56 in the case 50 provides airflow to the cabin. The air provided to the cabin is dehumidified as it passes through the evaporator 48 and is heated as it passes through the first heat exchanger 38.

Figure 6:
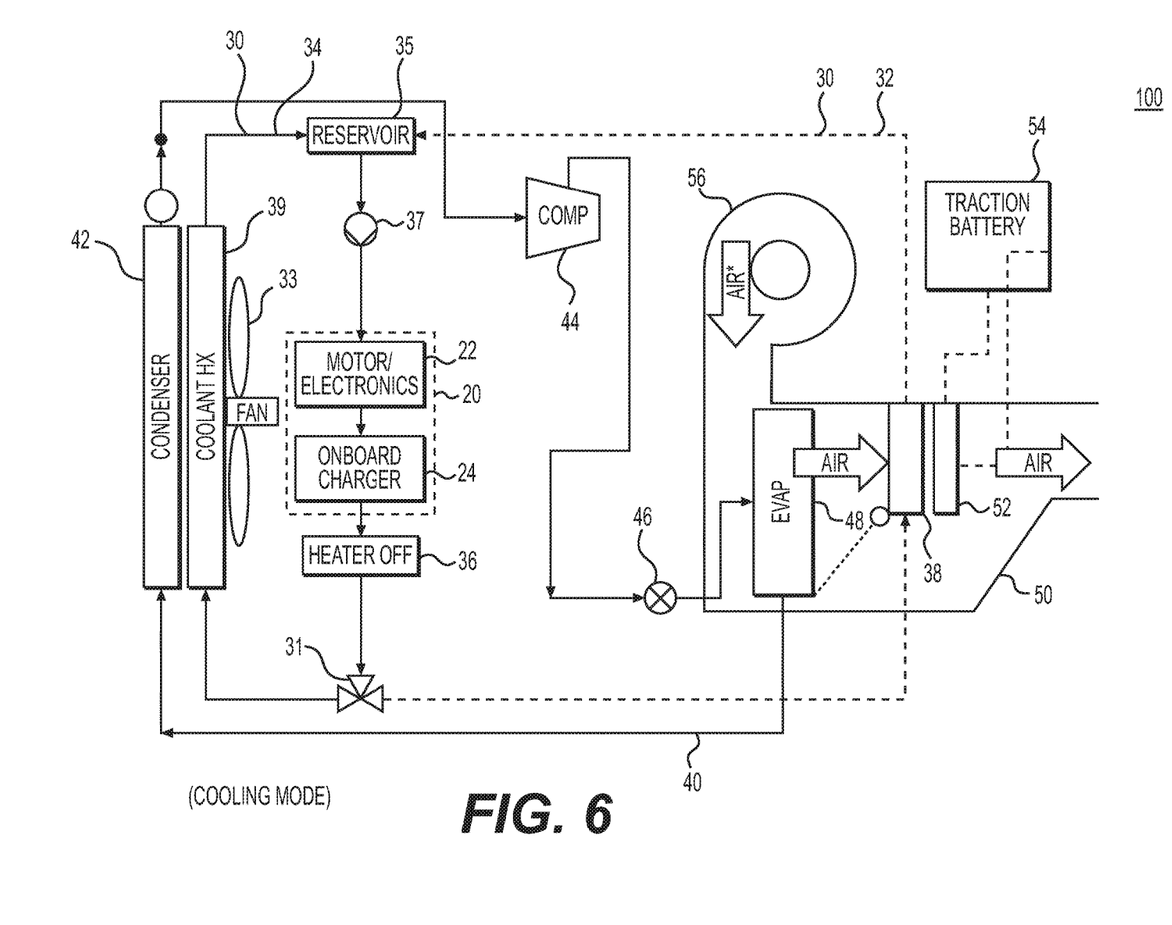
FIG. 6 is a schematic view illustrating an HVAC system in a cooling mode.

FIG. 6 shows the HVAC system 100 in the cooling mode. In the cooling mode, coolant heated by the first heat source 20 is circulated in the second sub-loop 34 of the primary loop 30 and cooled as it passes through the second heat exchanger 39. In the cooling mode, the second heat source 36 is off, the air heater 52 is off, the refrigerant is circulated in the secondary loop 40, and the blower 56 in the case 50 provides airflow to the cabin. The air provided to the cabin is cooled as it passes through the evaporator 48.

The present disclosure also provides a method of efficiently heating a cabin of a vehicle. The method comprises providing a heating, ventilation, and air conditioning (HVAC) system 100 such as that described above and shown in FIG. 1.; determining, by an Engine Control Unit (ECU), that the vehicle is charging and that the vehicle is idling; measuring, by a sensor, a cabin temperature in the cabin of the vehicle; and determining whether the cabin temperature measured is less than a desired temperature set point for the cabin.

Again referring to FIGS. 2 and 3, another form provides that when it is determined that the cabin temperature measured is less than the desired temperature set point for the cabin, the method further comprises operating the HVAC system 100 in a preconditioning mode. The preconditioning mode includes operating the secondary loop 40 in an off mode, wherein refrigerant is not circulated in the secondary loop; operating the second heat source 36 in an on mode, wherein the second heat source 36 produces or emits heat; and circulating the coolant in the first sub-loop 32 of the primary loop 30. In this mode, the coolant is heated by waste heat emitted by the first heat source 20 and the coolant is further heated by heat produced or emitted by the second heat source 36.

In yet another form, when the coolant circulating in the first sub-loop 32 is heated sufficiently to reach or achieve a temperature that is less than a predetermined coolant temperature, the preconditioning mode further includes: operating the air heater 52 in an off mode, wherein the air heater 52 does not produce or emit heat; and operating the blower 56 in an off mode, wherein the blower 56 does not provide airflow to the cabin, as shown in FIG. 2 and described above with regards to the first phase of the preconditioning mode.

Additionally, when the coolant circulating in the first sub-loop 32 is heated sufficiently to reach or achieve a temperature that is greater than or equal to a predetermined coolant temperature, the preconditioning mode may further include: operating the blower 56 in an on mode, wherein the blower 56 provides airflow to the cabin; and operating the air heater 52 in an on mode, wherein the air heater 52 produces heat, as shown in FIG. 3 and described above with regards to the second phase of the preconditioning mode. In this mode of operation air provided to the cabin by the blower 56 is heated by heat dissipated by the first heat exchanger 38 and by heat produced by the air heater 52.

In yet another form of the present disclosure, when it is determined that the cabin temperature measured is greater than or equal to the desired temperature set point for the cabin, the method may further comprise operating the HVAC system in a heating mode as shown in FIG. 4. The heating mode includes: operating the secondary loop 40 in an off mode, wherein refrigerant is not circulated in the secondary loop 40; operating second heat source 36 in an off mode, wherein the second heat source 36 does not produce or emit heat; circulating the coolant in the first sub-loop 32 of the primary loop 30, wherein the coolant is heated by waste heat emitted by the first heat source 20; operating the blower 56 in an on mode, wherein the blower 56 provides airflow to the cabin; operating the air heater 52 in an on mode, wherein the air heater 52 produces and emits heat; and wherein air provided to the cabin by the blower 56 is heated by heat dissipated by the first heat exchanger 38 and by heat produced or emitted by the air heater 52.

In another form, the method further comprises operating the HVAC system 100 in a dry heating mode. As shown in FIG. 5 and as explained above, the dry heating mode includes: operating the secondary loop 40 in an on mode, wherein refrigerant is circulated in the secondary loop 40; operating second heat source 36 in an off mode, wherein the second heat source 36 does not produce or emit heat; circulating the coolant in the first sub-loop 32 of the primary loop 30, wherein the coolant is heated by waste heat emitted by the first heat source 20; operating the blower 56 in an on mode, wherein the blower 56 provides airflow to the cabin; operating the air heater 52 in an off mode, wherein the air heater 52 does not produce heat; wherein air provided to the cabin by the blower 56 is dehumidified as it passes through the evaporator 48 and wherein the air provided to the cabin is heated by heat dissipated by the first heat exchanger 38.

Further areas of applicability will become apparent from the description provided herein. It should be understood that the description and specific examples are intended for purposes of illustration only and are not intended to limit the scope of the present disclosure.

What is claimed is:

1. A heating, ventilation, and air conditioning (HVAC) system for a vehicle having a first heat source and a cabin, the HVAC system comprising:
    a case having a blower for delivering air to the cabin of the vehicle;
    a primary loop through which a coolant circulates, the primary loop having a first sub-loop and a second sub-loop, the first sub-loop including the first heat source, a second heat source, and a first heat exchanger, the first sub-loop partially extending into the case of the HVAC system to place the first heat exchanger adjacent an air heater, the second sub-loop of the primary loop including the first heat source, the second heat source, and a second heat exchanger; wherein the first sub-loop and the second sub-loop share a line, the line including a reservoir, a coolant pump, the first heat source, the second heat source, and a control valve, the line configured such that the coolant circulates through the reservoir, the coolant pump, the first heat source, the second heat source, and the control valve in both the first sub-loop and the second sub-loop of the primary loop; and
    a secondary loop through which a refrigerant circulates, the secondary loop including a third heat exchanger, a compressor, an expansion valve, and an evaporator, the secondary loop exchanging heat with the second sub-loop of the primary loop.

2. The HVAC system of claim 1, wherein the first and second heat exchangers are coolant-to-air heat exchangers.

3. The HVAC system of claim 1, wherein the first heat source of the primary loop is at least one of a motor, an electric device, or an onboard charger of an electric vehicle.

4. The HVAC system of claim 1, wherein the second heat source is an electric coolant heater disposed along the primary loop downstream of the first heat source.

5. The HVAC system of claim 1, wherein the air heater is an electric heater that is powered by a traction battery.

6. The HVAC system of claim 1, wherein the primary loop further includes a control valve disposed downstream of the second heat source, the control valve configured to control whether the coolant circulates in the first sub-loop or the second sub-loop of the primary loop.

7. The HVAC system of claim 1, wherein the system has a first preconditioning mode when the vehicle is charging and idling and when a measured temperature of the air in the cabin is less than a desired temperature of the air in the cabin, the system is configured in the first preconditioning mode to circulate the coolant in the first sub-loop of the primary loop which is heated by the first heat source, and wherein the second heat source is on to further heat the coolant, and wherein the refrigerant is not circulated in the secondary loop.

8. The HVAC system of claim 7 further comprising a second preconditioning mode wherein the air heater is off and the blower does not provide airflow to the cabin until the coolant circulating in the first sub-loop of the primary loop is heated to a predetermined coolant temperature.

9. The HVAC system of claim 8, wherein, when the coolant circulating in the first sub-loop of the primary loop is heated to the predetermined coolant temperature in the second preconditioning mode, the blower in the case provides airflow to the cabin, and wherein the air provided to the cabin is heated by the first heat exchanger and the air heater is on to further heat the air as it is provided to the cabin.

10. The HVAC system of claim 1, wherein the system further includes a cooling mode wherein the coolant heated by the first heat source circulates in the second sub-loop of the primary loop and is cooled as it passes through the second heat exchanger, in the cooling mode the second heat source is off, the air heater is off, the refrigerant is circulated in the secondary loop, and the blower in the case provides airflow to the cabin, wherein the air provided to the cabin is cooled as it passes through the evaporator.

11. The HVAC system of claim 1, wherein the system further includes a heating mode wherein the coolant heated by the first heat source circulates in the first sub-loop of the primary loop, in the heating mode the second heat source is off, the refrigerant is not circulated in the secondary loop, and the blower in the case provides airflow to the cabin, wherein the air provided to the cabin is heated as it passes through the first heat exchanger and the air heater is on to further heat the air as it is provided to the cabin.

12. The HVAC system of claim 1, wherein the system further includes a dry heating mode wherein the coolant heated by the first heat source circulates in the first sub-loop of the primary loop, in the dry heating mode the second heat source is off, the air heater is off, the refrigerant is circulated in the secondary loop, and the blower in the case provides airflow to the cabin, wherein the air provided to the cabin is dehumidified as it passes through the evaporator, and wherein the air provided to the cabin is heated as it passes through the first heat exchanger.

13. A method of heating a cabin of a vehicle, the method comprising:
    providing a heating, ventilation, and air conditioning (HVAC) system comprising: a primary loop through which a coolant circulates, the primary loop having a first sub-loop and a second sub-loop, the first sub-loop including a first heat source, a second heat source, and a first heat exchanger, the first sub-loop partially extending into a case of the HVAC system to place the first heat exchanger adjacent an air heater, the second sub-loop of the primary loop including the first heat source, the second heat source, and a second heat exchanger; wherein the first and second sub-loops share a line, the line including a reservoir, a coolant pump, the first heat source, the second heat source, and a control valve, the line configured such that the coolant circulates through the reservoir, the pump, the first heat source, the second heat source, and the control valve in both the first sub-loop and the second sub-loop of the primary loop, the control valve disposed downstream of the second heat source, the control valve configured to control whether the coolant circulates in the first sub-loop or the second sub-loop of the primary loop based on a mode of operation; and a secondary loop through which a refrigerant circulates, the secondary loop including a third heat exchanger, a compressor, an expansion valve, and an evaporator;

determining, by an Engine Control Unit (ECU), that the vehicle is charging and that the vehicle is idling;

measuring, by a sensor, a cabin temperature in the cabin of the vehicle; and determining whether the cabin temperature measured is less than a desired temperature set point for the cabin.

14. The method of claim 13, wherein when it is determined that the cabin temperature measured is less than the desired temperature set point for the cabin, the method further comprises operating the HVAC system in a preconditioning mode, the preconditioning mode including:

operating the secondary loop in an off mode, wherein the refrigerant is not circulated in the secondary loop;

operating the second heat source in an on mode, wherein the second heat source produces heat; and circulating the coolant in the first sub-loop of the primary loop, wherein the coolant is heated by waste heat emitted by the first heat source and wherein the coolant is further heated by heat produced by the second heat source.

15. The method of claim 14, wherein when the coolant circulating in the first sub-loop has a temperature that is less than a predetermined coolant temperature, the preconditioning mode further includes:

operating the air heater in an off mode, wherein the air heater does not produce heat; and operating a blower in an off mode, wherein the blower does not provide airflow to the cabin.

16. The method of claim 14, wherein when the coolant circulating in the first sub-loop has a temperature that is greater than or equal to a predetermined coolant temperature, the preconditioning mode further includes:

operating a blower in an on mode, wherein the blower provides airflow to the cabin; and operating the air heater in an on mode, wherein the air heater produces heat;

wherein air provided to the cabin by the blower is heated by heat dissipated by the first heat exchanger and by heat produced by the air heater.

17. The method of claim 13, wherein when it is determined that the cabin temperature measured is greater than or equal to the desired temperature set point for the cabin, the method further comprises operating the HVAC system in a heating mode, the heating mode including:

operating the secondary loop in an off mode, wherein the refrigerant is not circulated in the secondary loop;

operating the second heat source in an off mode, wherein the second heat source does not produce heat;

circulating the coolant in the first sub-loop of the primary loop, wherein the coolant is heated by waste heat emitted by the first heat source;

operating a blower in an on mode, wherein the blower provides airflow to the cabin;

operating the air heater in an on mode, wherein the air heater produces heat;

wherein air provided to the cabin by the blower is heated by heat dissipated by the first heat exchanger and by heat produced by the air heater.

18. The method of claim 13, wherein the method further comprises operating the HVAC system in a dry heating mode, the dry heating mode including:

operating the secondary loop in an on mode, wherein the refrigerant is circulated in the secondary loop;

operating the second heat source in an off mode, wherein the second heat source does not produce heat;

circulating the coolant in the first sub-loop of the primary loop, wherein the coolant is heated by waste heat emitted by the first heat source;

operating a blower in an on mode, wherein the blower provides airflow to the cabin;

operating the air heater in an off mode, wherein the air heater does not produce heat;

wherein air provided to the cabin by the blower is dehumidified as it passes through the evaporator and wherein the air provided to the cabin is heated by heat dissipated by the first heat exchanger.

\* \* \* \* \*

UNITED STATES PATENT AND TRADEMARK OFFICE
CERTIFICATE OF CORRECTION

PATENT NO. : 10,315,493 B2
APPLICATION NO. : 15/634278
DATED : June 11, 2019
INVENTOR(S) : Antonio Vespa, Nicos Agathocleous and John Meyer It is certified that error appears in the above-identified patent and that said Letters Patent is hereby corrected as shown below:

In the Specification

Column 1, Line 10, before "BACKGROUND", insert:
--STATEMENT REGARDING FEDERALLY SPONSORED RESEARCH OR DEVELOPMENT
This invention was made with government support under DE-EE0008478 awarded by the Department of Energy. The government has certain rights in this invention.--

Signed and Sealed this
Thirteenth Day of February, 2024

Katherine Kelly Vidal
*Director of the United States Patent and Trademark Office*